(12) United States Patent
Issa et al.

(10) Patent No.: US 8,719,042 B1
(45) Date of Patent: May 6, 2014

(54) ECOSYTEM BASED APPLICATION SELECTION AND REPLACEMENT

(75) Inventors: Philip Issa, Coppell, TX (US); Bryan R. Loyd, McKinney, TX (US); Joseph H. Morton, Leawood, KS (US); Vijaykumar Musuvathy, Flower Mound, TX (US); Paul Park, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1924 days.

(21) Appl. No.: 11/539,528

(22) Filed: Oct. 6, 2006

(51) Int. Cl.
*G06Q 10/00* (2012.01)
(52) U.S. Cl.
USPC .......................................... 705/1.1; 705/7.12
(58) Field of Classification Search
CPC ....................................................... G06Q 10/10
USPC .................................................. 705/1.1, 7.12
See application file for complete search history.

(56) References Cited

U.S. PATENT DOCUMENTS 6,249,769 B1 * 6/2001 Ruffin et al. ..................... 705/7

OTHER PUBLICATIONS

Kelly, "The TeleManagement Forum's Enhanced Telecom Operations Map (eTOM)," Mar. 2003.*
MacLeod, Marcia, "Merger Made Easy with Well-Planned IT system," Purchasing & Supply Management, suppl. Logistics (Mar. 1994): 22.*

* cited by examiner

*Primary Examiner* — Carrie Gilkey (57) ABSTRACT

A system for functional domain based information technology selection and replacement is provided. Applications for each of multiple entities are associated with a set of functional domains. The set of functional domains are associated with a set of ecosystems. Data is complied for each ecosystem. Applications are adopted for one entity associated with an ecosystem, for each ecosystem, based on compiled data.

20 Claims, 9 Drawing Sheets

Circle one number per row below using the scale:

1 = Equal   3 = Moderate   5 = Strong   7 = Very strong   9 = Extreme

| # | Criterion A | | | | | | | | | Criterion B |
|---|---|---|---|---|---|---|---|---|---|---|
| 1 | Business Value | 9 | 8 | 7 | 6 | 5 | 4 | 3 | 2 | 1 | 2 | 3 | 4 | 5 | 6 | 7 | 8 | 9 | Functional Value |
| 2 | Business Value | 9 | 8 | 7 | 6 | 5 | 4 | 3 | 2 | 1 | 2 | 3 | 4 | 5 | 6 | 7 | 8 | 9 | Technology Fit |
| 3 | Business Value | 9 | 8 | 7 | 6 | 5 | 4 | 3 | 2 | 1 | 2 | 3 | 4 | 5 | 6 | 7 | 8 | 9 | Cost |
| 4 | Business Value | 9 | 8 | 7 | 6 | 5 | 4 | 3 | 2 | 1 | 2 | 3 | 4 | 5 | 6 | 7 | 8 | 9 | Complexity |
| 5 | Business Value | 9 | 8 | 7 | 6 | 5 | 4 | 3 | 2 | 1 | 2 | 3 | 4 | 5 | 6 | 7 | 8 | 9 | Quality |
| 6 | Functional Value | 9 | 8 | 7 | 6 | 5 | 4 | 3 | 2 | 1 | 2 | 3 | 4 | 5 | 6 | 7 | 8 | 9 | Technology Fit |
| 7 | Functional Value | 9 | 8 | 7 | 6 | 5 | 4 | 3 | 2 | 1 | 2 | 3 | 4 | 5 | 6 | 7 | 8 | 9 | Cost |
| 8 | Functional Value | 9 | 8 | 7 | 6 | 5 | 4 | 3 | 2 | 1 | 2 | 3 | 4 | 5 | 6 | 7 | 8 | 9 | Complexity |
| 9 | Functional Value | 9 | 8 | 7 | 6 | 5 | 4 | 3 | 2 | 1 | 2 | 3 | 4 | 5 | 6 | 7 | 8 | 9 | Quality |
| 10 | Technology Fit | 9 | 8 | 7 | 6 | 5 | 4 | 3 | 2 | 1 | 2 | 3 | 4 | 5 | 6 | 7 | 8 | 9 | Cost |
| 11 | Technology Fit | 9 | 8 | 7 | 6 | 5 | 4 | 3 | 2 | 1 | 2 | 3 | 4 | 5 | 6 | 7 | 8 | 9 | Complexity |
| 12 | Technology Fit | 9 | 8 | 7 | 6 | 5 | 4 | 3 | 2 | 1 | 2 | 3 | 4 | 5 | 6 | 7 | 8 | 9 | Quality |
| 13 | Cost | 9 | 8 | 7 | 6 | 5 | 4 | 3 | 2 | 1 | 2 | 3 | 4 | 5 | 6 | 7 | 8 | 9 | Complexity |
| 14 | Cost | 9 | 8 | 7 | 6 | 5 | 4 | 3 | 2 | 1 | 2 | 3 | 4 | 5 | 6 | 7 | 8 | 9 | Quality |
| 15 | Complexity | 9 | 8 | 7 | 6 | 5 | 4 | 3 | 2 | 1 | 2 | 3 | 4 | 5 | 6 | 7 | 8 | 9 | Quality |

| Migrating Functional Domains List 1002 | Information Technology Value 1008 | Business Value 1010 | Combined Value 1012 | Combined Cost to Migrate 1014 | Category 1016 |
|---|---|---|---|---|---|
| Second Billing Functional Domain 1004 | $200,000 | $300,000 | $500,000 | $100,000 | Approved |
| Second Care Functional Domain 1006 | $120,000 | $240,000 | $360,000 | $270,000 | Starved |
| First Network Engineering Functional Domain 504 | $100,000 | $150,000 | $250,000 | $1,000,000 | Deferred |
| First Network Planning Functional Domain 506 | $175,000 | -$300,000 | -$125,000 | $140,000 | Deferred |

ECOSYTEM BASED APPLICATION SELECTION AND REPLACEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Businesses must often face redundancy issues. For example, in the context of a merger, a first enterprise with many software applications may merge with a second enterprise with many software applications to create a resulting enterprise with many software applications. The resulting enterprise may save much of the time and effort required to develop and maintain applications by eliminating applications for one enterprise that are duplicative of applications for the other enterprise. As another example, in the context of streamlining business operations, an enterprise may save much of the time and effort required to develop and maintain applications by combining entities or groups within the enterprise and eliminating applications for one entity that are duplicative of applications for another entity.

However, when enterprises are merged or when entities within an enterprise are combined, the elimination of duplicative applications does not necessarily result in any savings. For example, the process of determining which applications to eliminate (particularly for merging enterprises having thousands of applications) may prove to be so time-consuming and costly that even with cost reductions from elimination of duplicative applications, the overall result is a loss. Because the adopted applications may be from different enterprises, additional costs may arise from creating new interfaces between such applications.

Furthermore, application users for each enterprise may prefer to retain the applications with which they are already familiar. Such preferences make objective decisions difficult regarding which of the hundreds to even thousands of applications are the best choices to be eliminated. Additionally, a process that often results in unexpected losses instead of savings is the prioritizing of schedules for when applications will be eliminated.

SUMMARY

Disclosed herein are systems and methods for efficiently selecting applications to achieve organizational synergies. In some method embodiments, applications for each of multiple entities are associated with a set of functional domains. The set of functional domains are grouped into a set of ecosystems. Data is compiled for each ecosystem. Based on compiled data, applications associated with an ecosystem are adopted from an entity, and the process repeats for each ecosystem.

Some system embodiments include a database manager and a web interface. The database manager associates applications for each of multiple entities with a set of functional domains, and groups the set of functional domains into a set of ecosystems. A user interface compiles data for each ecosystem. Then, based on compiled data, the user interface adopts applications associated with an ecosystem from an entity, for each ecosystem.

In other method embodiments, information technology value is evaluated for migration of each of multiple non-adopted applications. Business value is evaluated for migration of each non-adopted application. Information technology value and business value are combined for each non-adopted functional domain based on non-adopted applications in that functional domain. Each non-adopted functional domain is prioritized for migration based on the combined value and is categorized for migration based on these priorities.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

In embodiments of the present disclosure, systems and methods for a functional domain based application selection and replacement are provided. A database manager groups related applications into a set of functional domains, for each merging or combining entity. Then the database manager groups the set of functional domains into a set of ecosystems for each entity, and compiles application data for each ecosystem. In contrast to the time-consuming and costly process of evaluating each individual application to decide on which duplicative applications are eliminated, a user interface enables a user to decide, based on the compiled application data, which ecosystems of duplicative applications are eliminated. In other words, primary adoption decisions are made at an ecosystem level rather than on an application or functional domain level.

For each ecosystem of duplicative applications that is eliminated, or non-adopted, the ecosystem's functional domains are scheduled for migration to the resulting entity. The migration to the resulting entity results in replacing the duplicative applications for non-adopted functional domains with the duplicative applications for adopted functional domains. Migration schedules are based on the value of migrating the underlying applications. Instead of only evaluating information technology value for migrating non-adopted functional domains, business value is also evaluated for the migrating non-adopted functional domains. The combined business value and the information technology value for each functional domain determines both the priority for scheduling the order of replacement of non-adopted functional domains and the category for the scheduled replacement, such as approved or deferred, based on available migration resources.

Figure 1:
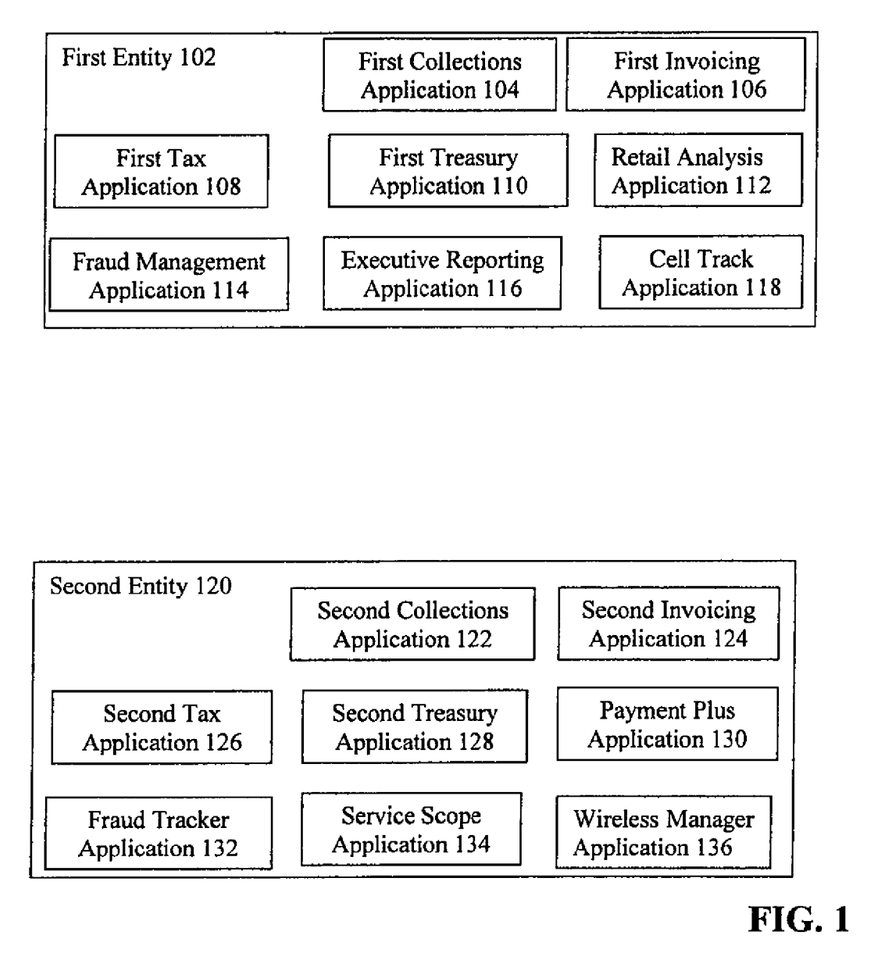
FIG. 1 shows entities having a set of associated applications.

Turning now to FIG. 1, two entities are shown each having a set of associated applications. A "first entity" 102 has a "first collections application" 104, a "first invoicing application" 106, a "first tax application" 108, a "first treasury application" 110, a "retail analysis application" 112, a "fraud management application" 114, an "executive reporting application" 116, and a "cell track application" 118. A "second entity" 120 has a "second collections application" 122, a "second invoicing application" 124, a "second tax application" 126, a "second treasury application" 128, a "payment plus application" 130, a "fraud tracker application" 132, a "service scope application" 134, and a "wireless manager application" 136. The "first entity" 102 and the "second entity" 120 may be separate entities that are to be combined into one resulting entity within one enterprise or they may be separate enterprises that are being merged to create one resulting enterprise. The numbers and types of each entity and application in FIG. 1 are depicted for the purpose of an illustrative example only, and should not be considered limiting.

In some limited circumstances, the descriptions applications for the different entities may suggest which applications should be evaluated against each other to determine the elimination of duplicative applications. For example, the "first collections application" 104 and the "first invoicing application" 106 for the "first entity" 102 may be evaluated against the "second collections application" 122 and the "second invoicing application" 124 for the "second entity" 120 to determine which of the redundant applications should be eliminated. The evaluation may indicate that the "second collections application" 122 and the "first invoicing application" 106 are superior and hence the "first collections application" 104 and the "second invoicing application" 124 should be eliminated.

However, the elimination of the "first collections application" 104 and the "second invoicing application" 124 may create additional expenses. For example, each collections application may have a significant number of interfaces with its corresponding invoicing application. Therefore, an extensive set of new interfaces would need to be created to interface between the adopted applications 106 and 122. The creation of new interfaces would not have been necessary had the first collections application 104 been adopted with the "first invoicing application" 106, or had the "second invoicing application" 124 been adopted with the "second collections application" 122. Furthermore, the time and effort required to create the new interfaces may be greater than the synergy savings resulting from the elimination of the duplicative applications.

Additionally, the evaluation of applications to determine which applications are duplicative applications to be eliminated may prove to be time-consuming and costly, particularly for applications whose functions do not clearly correspond to each other. For example, extensive evaluation may be required to determine whether the "fraud management application" 114 and the "fraud tracker application" 132 are duplicative applications, or whether one application has functionality that is not duplicative of the other. The functions of the "fraud tracker application" 132 may need to be combined with some of the functions of the "payment plus application" 130 to result in functions that are duplicative of the functions of the "fraud management application" 114. The need to combine functions of applications for entities when evaluating applications may result in an application evaluation process that compares the functions of each application for one entity against the functions of each application of the other entity, a time-consuming and costly process.

Figure 2:
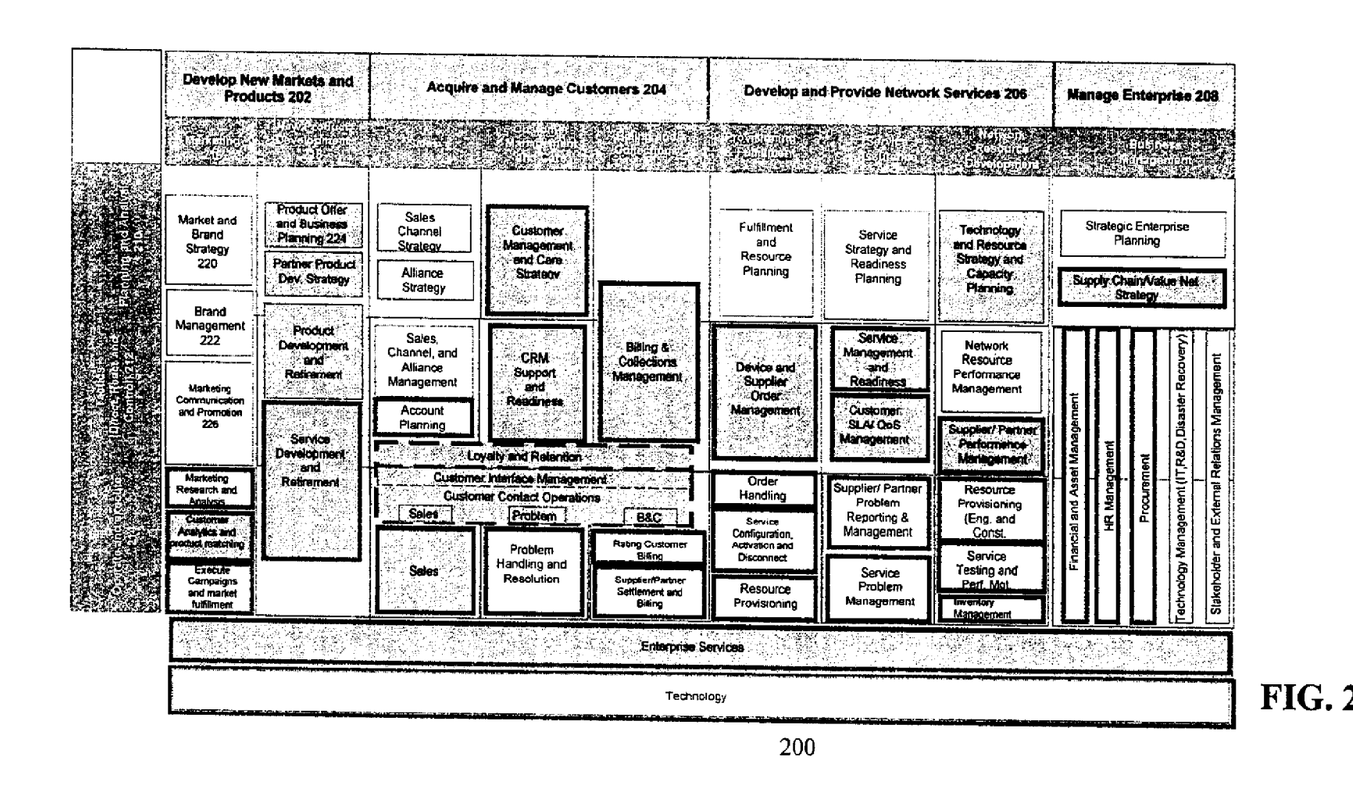
FIG. 2 shows a block diagram of an illustrative telecommunications entity, organized by functional domains.

Turning now to FIG. 2, a block diagram 200 of an illustrative telecommunications entity, organized by functional domains. Each functional domain is a group of related applications. The set of functional domains should be applicable to each entity that is to be combined or merged. Embodiments of the present disclosure organize applications into groups corresponding to the functional domains to enable a more efficient evaluation. The applications are evaluated for elimination as a group, rather than on an individual basis. The functional domains in the block diagram 200 are depicted in FIG. 2 for the purpose of an illustrative example only, as the block diagram 200 may include any type of functional domains.

The functional domains are a standardized map for operations of a telecommunications business. Embodiments of the present disclosure use the standardized map as a framework for organizing applications. The terminology for each functional domain may be loosely based on enhanced telecom operations map standards to offer some terminology familiarity to method and system users. Applications may be grouped in functional domains based on the business category of the applications and the functions of the applications. In the present example, the business categories for functional domains include: "develop new markets and products" 202, "acquire and manage customers" 204, "develop and provide network services" 206, and "manage enterprise" 208. The business categories may be divided into general functions that include: "planning and analysis" 210, "tactics (direct, redirect, and control)" 212, and "operate and execute" 214. The business categories for functional domains may be further divided into sub-categories, such as a "marketing" 216 sub-category and a "new product development" 218 sub-category, which are sub-categories for the "develop new markets and products" 202 business category.

A "market and brand strategy" 220 functional domain may include applications associated with market strategy and applications associated with brand strategy. The "market and brand strategy" 220 functional domain may be associated with the "planning and analysis" 210 functions and associated with the "marketing" 216 sub-category, associations which determine the location of the "market and brand strategy" 220 functional domain in the block diagram 200. In addition to being associated with the "marketing" 216 sub-category, a "brand management" 222 functional domain may include applications associated with both the "planning and analysis" 210 functions and the "tactics" 212 functions. This combination of associations determines the location of the "brand management" 222 functional domain in the block diagram 200. In another example, a "product offer and business planning" 224 functional domain may be associated with the "planning and analysis" 210 functions and the "new product development" 218 sub-category, associations which determine the location of the "product offer and business planning" 224 functional domain in the block diagram 200.

In addition to grouping related applications into functional domains based on the business categories, sub-categories, and functions of the related applications, embodiments of the present disclosure may also organize related functional domains into ecosystems to evaluate collections of functional domains, very large duplicative sets of related applications, for elimination as a unit. For example, if the "market brand strategy" 220 functional domain has a significant number of interfaces with the "brand management" 222 function domain, then the creation of new interfaces between the "market brand strategy" 220 functional domain of one entity with the "brand management" 222 function domain of another entity may result in inefficiencies that under some circumstances would negate synergies created from eliminating duplicative applications in these functional domains. The significant number of interfaces between these functional domains may result in organizing the "market brand strategy" 220 functional domain and the "brand management" 222 functional domain into an ecosystem that may be evaluated as a single unit for the purposes of evaluating entities' applications to adopt going forward and hence which duplicative applications to work towards eliminating.

This ecosystem may correspond to the "marketing" 216 subcategory, and may also include a "marketing communication and promotion" 226 functional domain, provided that the "marketing communication and promotion" 226 functional domain has a significant connection with either the "brand management" 222 function domain or the "market brand strategy" 220 functional domain. Alternatively, this ecosystem may correspond to the "develop new markets and products" 202 business category provided that the "product offer and business planning" 224 functional domain has a significant connection with either the "brand management" 222 functional domain or the "market brand strategy" 220 functional domain.

Figure 3:
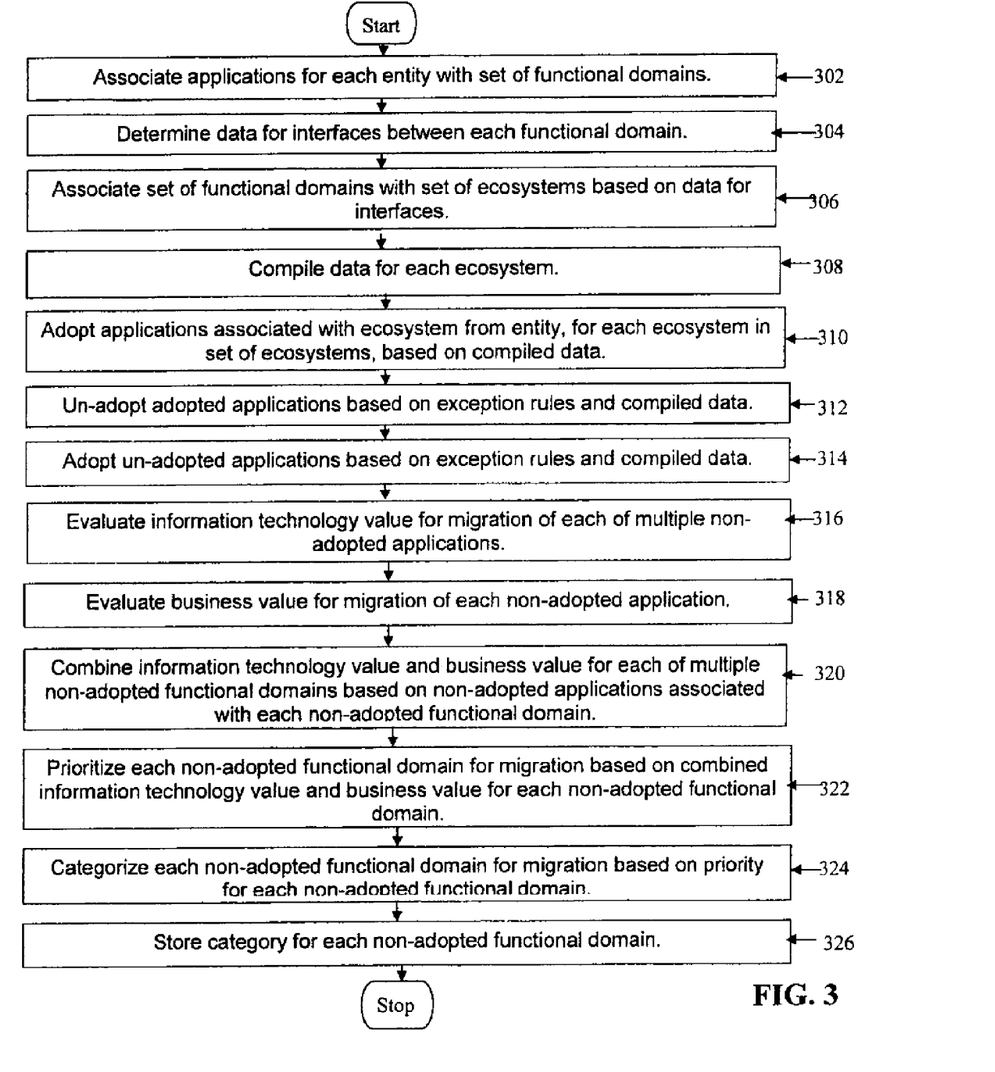
FIG. 3 shows an illustrative functional domain based application selection and replacement method according to some embodiments of the present disclosure.

Turning now to FIG. 3, an illustrative functional domain based information technology selection and replacement method is depicted according to some embodiments of the present disclosure. Executing the method results in selecting functional domains for elimination and scheduling some of these selected functional domains for elimination. The block diagrams of FIG. 4 through FIG. 10 are provided to illustrate examples for the execution of the blocks described in FIG. 3. However, the block diagrams of FIG. 4 through FIG. 10 are depicted for the purpose of illustrative examples only, and do not express or imply any limitations for the present disclosure.

In box 302, a database manager associates applications for each entity with a set of functional domains. The database manager groups applications into a set of functional domains to provide efficiency of scale when evaluating groups of duplicative applications for elimination. The database manager uses one set of functional domains as a template for each entity, such that each entity has its own set of functional domains that group applications similarly to the functional domains of other entities. For example, if a specific entity has its own billing functional domain, each entity has its own billing functional domain that is similar to, or parallel with, the billing functional domain of the specific entity. If a specific entity does not have applications associated with billing, the billing functional domain for the specific entity is empty, but the parallel structure of ecosystems from entity to entity is maintained.

Figure 4:
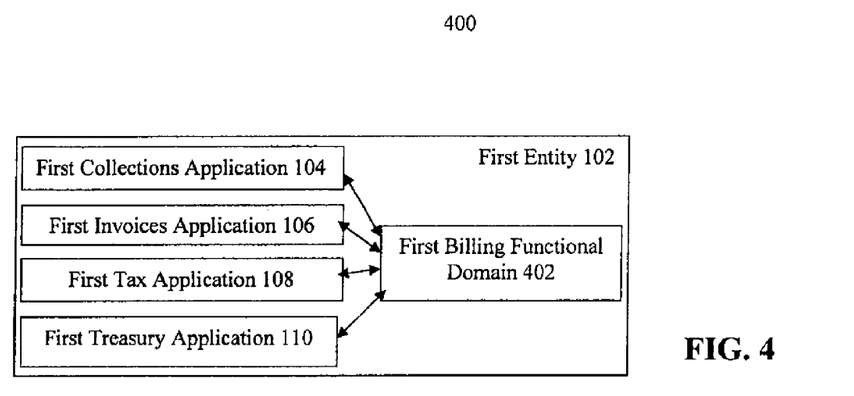
FIG. 4 shows a block diagram of an illustrative functional domain according to some embodiments of the present disclosure.

For an example of a billing functional domain, FIG. 4 depicts a block diagram 400 of one entity, its illustrative functional domain, and its associated applications. Because the first collections application 104, the first invoicing application 106, the first tax application 108, and the first treasury application 110 of the first entity are all applications that are associated with billing, the database manager associates these applications in the first entity 102 with a "first billing functional domain" 402.

In box 304 of FIG. 3, the database manager determines data for interfaces between each functional domain. The database manager may use the data for interfaces between each functional domain to indicate which functional domains are grouped into ecosystems. The functional domains may be grouped into ecosystems because of a significant number of interfaces, but functional domains may be grouped into ecosystems based on other reasons, such as a shared platform, contractual obligations, etc.

Figure 5:
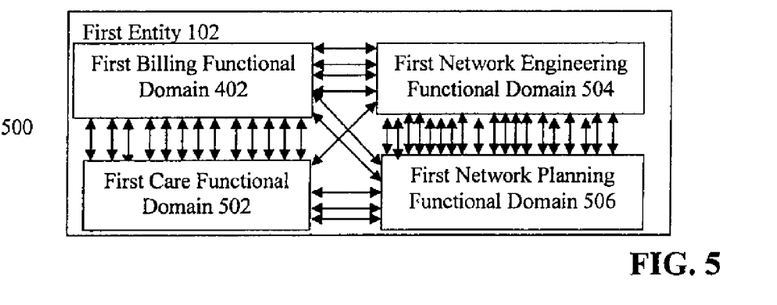
FIG. 5 shows a block diagram of illustrative functional domains according to some embodiments of the present disclosure.

For example, FIG. 5 depicts a block diagram 500 of illustrative functional domains, and their associated interfaces, for the first entity 102. Because the "first billing functional domain" 402 has a significant number of interfaces with a "first care functional domain" 502, the database manager may organize these functional domains together in an ecosystem. Because a "first network engineering functional domain" 504 has a significant number of interfaces with a "first network planning functional domain" 506, the database manager may organize these functional domains together in another ecosystem. However, neither the "first billing functional domain" 402 nor the "first care functional domain" 502 have a significant number of interfaces with either the "first network engineering functional domain" 504 or the "first network planning functional domain" 506. Therefore, the database manager does not need to organize any additional ecosystems and the database manager does not need to expand the ecosystems previously indicated by a significant number of interfaces.

In box 306 of FIG. 3, the database manager associates sets of functional domains with a set of ecosystems based on the data for interfaces. The database manager groups functional domains into ecosystems to provide efficiency of scale when evaluating large groups of duplicative applications for elimination.

Figure 6:
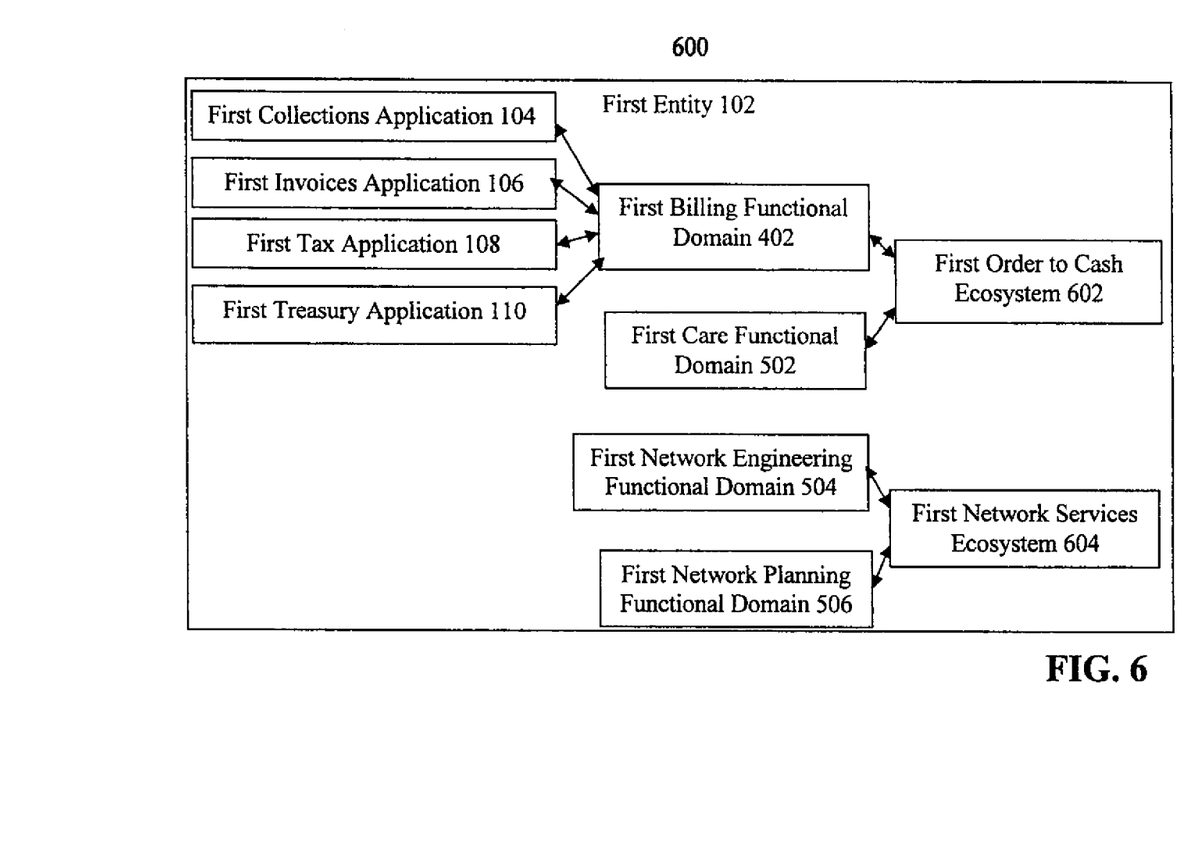
FIG. 6 shows a block diagram of illustrative ecosystems according to some embodiments of the present disclosure.

For example, FIG. 6 depicts a block diagram 600 of illustrative ecosystems, their associated functional domains, and their associated applications, for the "first entity" 102. Because the "first billing functional domain" 402 has a significant number of interfaces with the "first care functional domain" 502, the database manager may organize these functional domains together in an ecosystem, a "first order to cash ecosystem" 602. Because the "first network engineering functional domain" 504 has a significant number of interfaces with the "first network planning functional domain" 506, the database manager may organize these functional domains together in another ecosystem, a "first network services ecosystem" 604. Because neither the "first billing functional domain" 402 nor the "first care functional domain" 502 have a significant number of interfaces with either the first network engineering functional domain 504 or the "first network planning functional domain" 506, the "first order to cash ecosystem" 602 is a separate ecosystem from the "first network services ecosystem" 604.

If the database manager organizes specific functional domains into an ecosystem for a specific entity, the database manager organizes the corresponding functional domains in any combining or merging entity into the same type of ecosystem, or ecosystems parallel to the ecosystems of the specific entity. For example, if the database manager organizes functional domains into a network services ecosystem for one entity, the database manager organizes functional domains of other entities into network services ecosystems for the other entities. If the database manager organizes functional domains into one network services ecosystem for a first entity, and into two smaller network services ecosystems for a second entity, the database manager combines the two smaller network services ecosystems into one network services ecosystem for the second entity to maintain a parallel structure of ecosystems. If a specific entity does not have applications associated with network services, the network services ecosystem for the specific entity is empty, but the parallel structure of ecosystems from entity to entity is maintained. In some embodiments, the database manager may organize functional domains that have a relatively few number of interfaces together in an ecosystem if the number of applications associated with each functional domain is less than a minimum number of applications, such as 100 applications, for a functional domain to remain as a stand-alone ecosystem.

In box 308 of FIG. 3, a user interface compiles data for each ecosystem. Compiling data for the applications in each ecosystem enables the selection to adopt ecosystems that are the best fits for the resulting entity and the selection to eliminate the ecosystems that are not the best fits for the resulting entity. First, a survey of ecosystem factors is conducted to determine a best-fit profile for each ecosystem, resulting in a weight calculated for each ecosystem factor. Then an application questionnaire is used to rate each individual application based on the same ecosystem factors. Next, the ratings for each application are multiplied by the weight calculated for the corresponding ecosystem factors. The results of each multiplication are summed for each ecosystem, such that the ecosystems with the highest ecosystem sums are the best-fits relative to the corresponding types of ecosystems.

Figure 7:
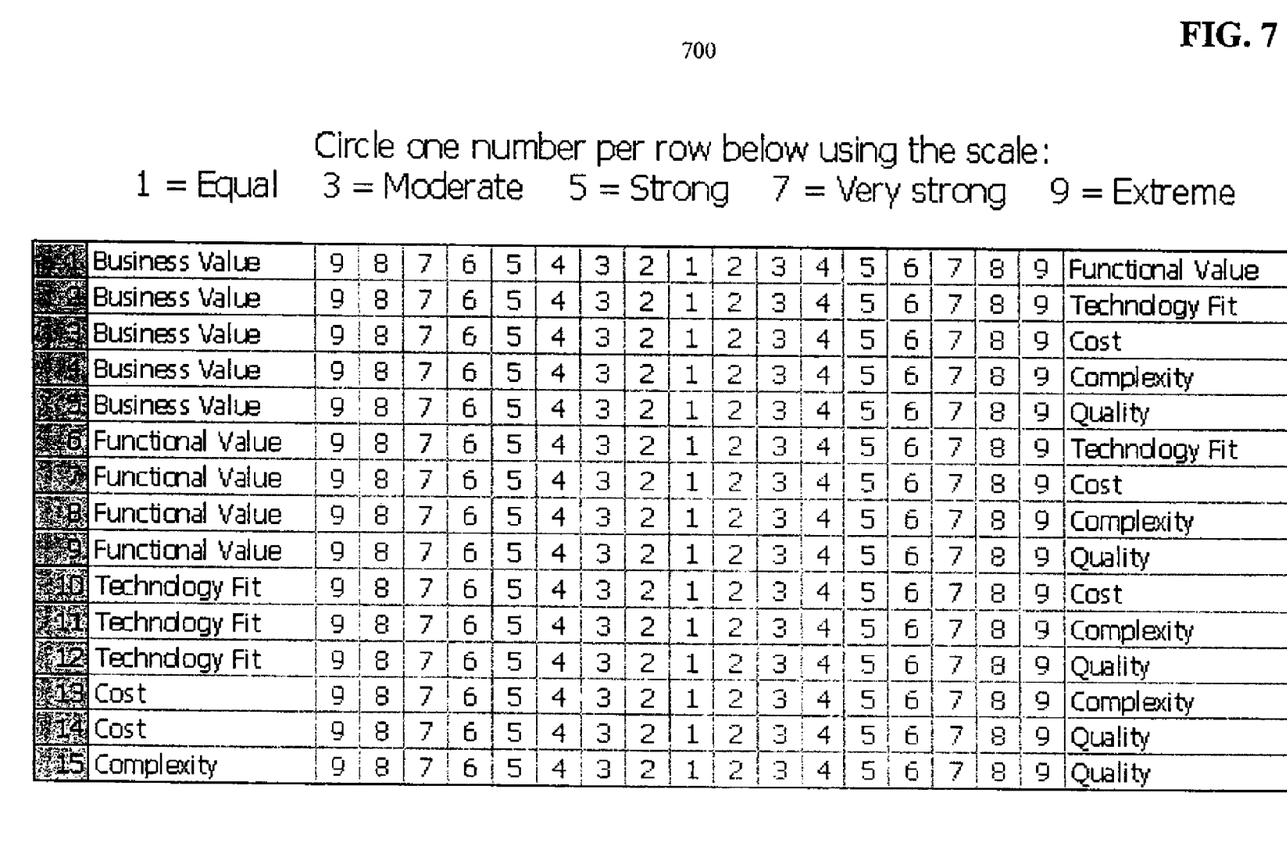
FIG. 7 shows an illustrative survey used for compiling data for each ecosystem according to some embodiments of the present disclosure.

For example, FIG. 7 depicts an illustrative survey used for compiling data for each ecosystem. To select each ecosystem that is the best fit for the resulting entity, a profile is established for each type of ecosystem based on identified factors, and the factors are used to determine which of the ecosystems for the merging or combining entities is a best fit for each ecosystem profile. The survey prompts business experts and information technology experts to evaluate each ecosystem based on pair-wise comparisons of multiple factors, which results in weights assigned to each of the multiple factors. For example, the survey prompts experts to compare six factors against each other, including business value, functional value, technology fit, cost, complexity, and quality. Business value may include direct business impact, usability, usage scope, and data scope. Cost may include total cost and number of functions performed. Complexity may include technical complexity, usage scope, and data scope. Quality may include technical quality, data quality, and support quality. The experts compare each of the factors against each of the other five factors for each ecosystem.

For example, the first line of the survey prompts an expert to compare the business value of a type of ecosystem against the functional value of the type of ecosystem, where the type of ecosystem may be the network services ecosystem that each entity has. If the business value for the ecosystem type is extreme in comparison to the functional value of the ecosystem type, the expert selects the number 9 closest to the phrase business value, with the number 9 representing extreme. Alternatively, if the functional value for the ecosystem type is strong compared to the business value for the ecosystem type, the expert selects the number 5 closest to the phrase functional value, with the number 5 representing strong.

After each expert assigns numerical values to each comparison between each of the six factors, the numerical values for each factor are totaled. The total numerical values for each factor are then divided by the collective total of numerical values for all factors to determine the weight assigned to each factor. For example, if the total numerical value assigned to technology fit equals 152, and the total numerical value assigned to all six factors equals 1000, then the weight assigned to the technology fit factor equals 0.152. The weights determined from such a survey indicate the relative importance that the business experts and the information technology experts attribute to each factor for a particular ecosystem type, and determine a profile for the particular ecosystem type. For example, these weights may be used to determine which network services ecosystem for one of the merging or combining entities is a best fit for this profile of a network services ecosystem.

Having determined the weights of each factor for a specific ecosystem type, a application questionnaire determines the user rating for each application associated with the specific ecosystem type. In contrast to a thorough evaluation of each application, which may be time-consuming and costly, the application questionnaire prompts users of an application to assign a simple rating to the application for each of the six factors. For example, an information technology user of an application may be prompted to specify a response time for the application over the last six months by selecting responses such as 96% to 100%, 91% to 95%, and 86% to 90%. Each response may have a pre-assigned rating value, such as 20 for 96% to 100%, 19 for 91% to 95%, and 18 for 86% to 90%. Then the weights assigned to each of the multiple factors are multiplied by the average rating value for the corresponding factor. For example, if the weight assigned to the business value equals 0.238 and the averaged rating value from the application questionnaire responses equals 15.0 for business value, the resulting weighted business value rating equals 3.57.

After the same calculations are made for each of the six factors, the combined weighted ratings determine the ecosystem that is the best fit for the profile of the specific ecosystem type because each averaged rating for a factor has been given the weight determined by the business experts and the information technology experts. For example, the survey of the business experts and the information technology experts may determine that the technology fit is the most important factor for the network services ecosystem type. In this case, the calculations based on the applications questionnaires associated with the various network services ecosystems will result in relatively high numerical values for network services ecosystems that are rated highly for technology fit by the users of the applications associated with the various network services ecosystems.

One method to remove the preference of application users for applications with which they are already familiar is for the specific application users of a specific entity to train the application users for the other entities to use the applications of the specific entity with which the specific application users are already familiar. After training is completed by the application users for each entity, each application user completes the application questionnaire for the applications that the application user has been trained to use. This cross-training and questionnaire completion results in more objective ratings for each application. When the surveys, training, and questionnaires are completed, the combined total numerical values objectively indicate which ecosystems are the best fits for their corresponding ecosystem profiles, and are therefore candidates for adoption, and which ecosystems are candidates for elimination.

In box 310 of FIG. 3, the user interface adopts applications associated with an ecosystem from an entity, for each ecosystem in the set of ecosystems, based on compiled data. Based on the compiled data, decisions are made at the ecosystem level about which applications are scheduled for adoption and which applications are scheduled for elimination. For each ecosystem, which has parallel ecosystems in other entities, one ecosystem is adopted from one of the merging or combining entities for the resulting entity.

Figure 8:
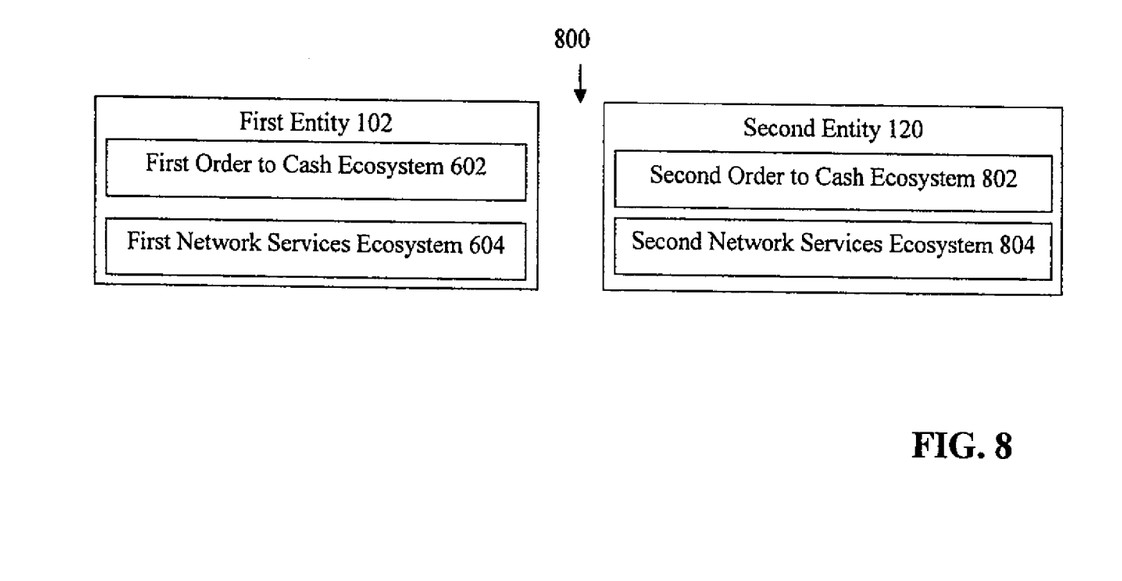
FIG. 8 shows a block diagram of illustrative entities according to some embodiments of the present disclosure.

For example, FIG. 8 depicts illustrative entities and their associated ecosystems. The "first entity" 102 is associated with the "first order to cash ecosystem" 602 and the "first network services ecosystem" 604. Therefore, the "second entity" 120 is associated with the same type of ecosystems as the "first entity" 102, or ecosystems parallel to the ecosystems for the "first entity" 102, such as a "second order to cash ecosystem" 802 and a "second network services ecosystem" 804. The "first entity" 102 and its corresponding ecosystems may be combined or merged with the "second entity" 120 and its corresponding ecosystems to create a resulting entity and its own corresponding ecosystems.

Figure 9:
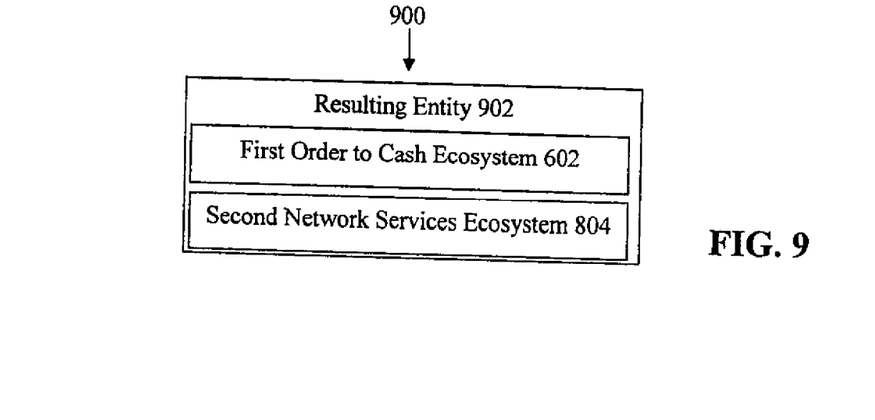
FIG. 9 shows a block diagram of an illustrative resulting entity according to some embodiments of the present disclosure.

For example, FIG. 9 depicts a "resulting entity" 902 and its associated ecosystems. The applications associated with the "first order to cash ecosystem" 602 for the "first entity" 102 are adopted for the "resulting entity" 902, based on the complied data. The data compiled in box 308 of FIG. 3 may indicate that the "first order to cash ecosystem" 602 is a better fit for the order to cash ecosystem profile than the "second order to cash ecosystem" 802. The applications associated with the "second network services ecosystem" 804 for the "second entity" 120 are adopted for the "resulting entity" 902, based on the complied data. The data compiled in box 308 may indicate that the "second network services ecosystem" 804 is a better fit for the network services ecosystem profile than the "first network services ecosystem" 604.

In box 312 of FIG. 3, the user interface un-adopts adopted applications based on the exception rules and the compiled data. For example, the data compiled in box 308 may indicate that the "first collections application" 104, which is associated with the adopted "first order to cash ecosystem" 602 is an unusually lowly rated application. Exception rules may identify an adopted application for un-adoption if a corresponding un-adopted application is of significantly higher rating, and the value of the time and effort required to create new interfaces for the un-adopted application is less than the value offered by adopting the un-adopted application. Continuing this example, the adopted "first collections application" 104 may have a significantly lower rating than the un-adopted "second collections application" 122, and only a few minor interfaces may need to be created for the un-adopted high quality "second collections application" 122 to interface with the "first order to cash ecosystem" 602. In this situation, the adopted "first collections application" 104 is un-adopted based on the exceptions rules and the compiled data, and replaced by the "second collections application" 122, which is interfaced with the "first order to cash ecosystem" 602.

In box 314, the user interface adopts un-adopted applications based on the exception rules and the compiled data. For example, the data compiled in box 308 may indicate that the "second collections application" 122, which is associated with the un-adopted "second order to cash ecosystem" 802 is an unusually highly rated application. Exception rules may identify an un-adopted application for adoption if the corresponding adopted application is of significantly lower rating, and the value of the time and effort required to create new interfaces for the un-adopted application is less than the value offered by adopting the un-adopted application. Continuing this example, the un-adopted "second collections application" 122 may have a significantly higher rating than the adopted "first collections application" 104, and only a few minor interfaces may need to be created for the un-adopted high quality "second collections application" 122 to interface with the "first order to cash ecosystem" 602. In this situation, the un-adopted "second collections application" 122 is adopted based on the exceptions rules and the compiled data, replacing the adopted "first collections application" 104 by interfacing with the "first order to cash ecosystem" 602.

In box 316, the database manager evaluates information technology values for migration, or replacement, of each of multiple non-adopted applications. For example, if two merging entities use their own billing functional domain, the resulting entity retains the adopted billing functional domain for the entity that already used the adopted billing functional domain, and replaces the un-adopted billing functional domain with the adopted billing functional domain for the entity that used the un-adopted billing functional domain. The database manager evaluates information technology values for each non-adopted application to determine the priority for migrating the non-adopted applications associated with each non-adopted functional domain. Applications are migrated on a functional domain level instead of on an ecosystem level because the functional domains within any ecosystem may offer a wide variety of values for present and future migrations.

Figure 10:
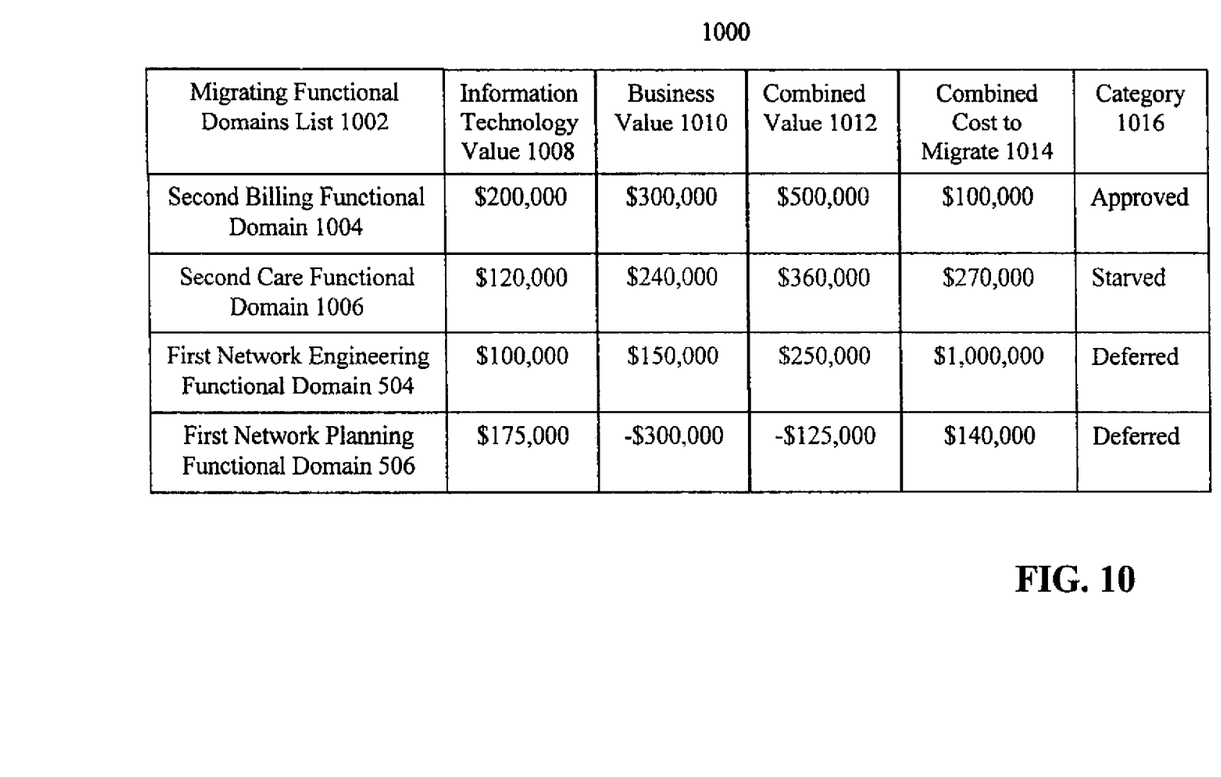
FIG. 10 shows a block diagram of an illustrative display for a functional domain based application selection and replacement system according to some embodiments of the present disclosure.

For example, FIG. 10 depicts an illustrative display 1000 for information technology value for migration of each non-adopted functional domain. Information technology experts may evaluate licensing costs, maintenance costs, development costs, and costs to achieve migration for the applications associated with each non-adopted functional domain. These costs may include costs to upgrade or replace hardware because some applications may be supported only by specific hardware that is selected for elimination. FIG. 10 depicts a column for listing the non-adopted functional domains, a "migrating functional domains list" 1002. The "list" 1002 includes a "second billing functional domain" 1004, a "second care functional domain" 1006, the "first network engineering functional domain" 504, and the "first network planning functional domain" 506. For example, the database manager determines that the information technology experts evaluate an "information technology value" 1008 of $200,000 in benefits from migrating the applications associated with the non-adopted "second billing functional domain" 1004.

In box 318 of FIG. 3, the database manager evaluates business values for migration of each non-adopted application. The database manager evaluates business values for each non-adopted application to determine the priority for migrating the non-adopted applications associated with each non-adopted functional domain. In contrast to information technology values, which are often evaluated when making decisions to migrate applications, business values are often completely overlooked, which may result in unexpected losses from migrating applications.

For example, FIG. 10 depicts the illustrative display 1000 for a "business value" 1010 for migration of each non-adopted functional domain. Business experts may evaluate synergies, cost savings, revenue generation, training costs, and costs to achieve migration for the applications associated with each non-adopted functional domain. The evaluated business values may be significantly greater than the evaluated information technology values. For example, the database manager may determine that the business experts evaluate the "business value" 1010 as $300,000 in benefits from migrating the applications associated with the non-adopted "second billing functional domain" 1004.

In box 320, the database manager combines the "information technology value" 1008 and the "business value" 1010 for each of multiple non-adopted functional domains based on non-adopted applications associated with each non-adopted functional domain. For example, FIG. 10 depicts the illustrative display 1000 a "combined value" 1012 for migration of each non-adopted functional domain. In this example, the "information technology value" of $200,000 and the "business value" 1010 of $300,000 are combined to create the "combined value" 1012 of $500,000 in benefits from migrating the applications associated with the non-adopted "second billing functional domain" 1004.

In box 322, the database manager prioritizes each non-adopted functional domain for migration based on the combined information technology value and business value for each non-adopted functional domain. For example, FIG. 10 depicts the illustrative display 1000 for each non-adopted functional domain, prioritized based on the "combined value" 1012 for migration of each non-adopted functional domain. The "second billing functional domain" 1004 is prioritized and listed first in the "list" 1002 of non-adopted functional domains because its "combined value" 1012 is $500,000. The "second care functional domain" 1006 is prioritized and listed second in the "list" 1002 of non-adopted functional domains because its "combined value" 1012 is $360,000. The "first network engineering functional domain" 504 is prioritized and listed third in the "list" 1002 of non-adopted functional domains because its "combined value" 1012 is $250,000. The "first network planning functional domain" 506 is prioritized and listed fourth in the "list" 1002 of non-adopted functional domains because its "combined value" 1012 is negative $125,000. The reason that the "combined value" 1012 for the "first network planning functional domain" 506 is negative $125,000 is because the business value experts evaluated the "business value" 1010 as negative $300,000 in benefits from migrating the applications associated with the "first network planning functional domain" 506. Enterprises that merge or combine entities without evaluating the "business value" 1010 for migrating the applications associated with non-adopted functional domain may proceed with a proposed migration without realizing that the costs of migration outweigh the benefits of migration.

In box 324, the database manager categorizes each non-adopted functional domain for migration based on the priority for each non-adopted functional domain. For example, FIG. 10 depicts the illustrative display 1000 for a "category" 1016 for migration of each non-adopted functional domain. The "category" 1016 is based on a comparison of the "combined value" 1012 for migrating the applications associated with each non-adopted functional domain against a "combined cost to migrate" 1014 for the corresponding non-adopted functional domain.

For example, the "combined value" 1012 is $500,000 in benefits from migrating the applications associated with the non-adopted "second billing functional domain" 1004, and the "combined cost to migrate" 1014 these applications is only $100,000. Provided that the enterprise has at least $100,000 budgeted for migrating applications, the enterprise may realize $500,000 of benefits from spending the $100,000 on migrating the applications associated with the "second billing functional domain" 1004. Therefore, the "category" 1016 is listed as "approved" for the migration of the applications associated with the "second billing functional domain" 1004.

In another example, the "combined value" 1012 is $360,000 of benefits from migrating the applications associated with the non-adopted "second care functional domain" 1006, and the "combined cost to migrate" 1014 these applications is only $270,000. Although the enterprise may have at least $100,000 budgeted for migrating applications associated with the "second billing functional domain" 1004, the enterprise may not have an additional $270,000 budgeted for migrating the applications associated with the "second care functional domain" 1006 to realize $360,000 of benefits. Therefore, the "category" 1016 is listed as "starved" for the migration of the applications associated with the "second care functional domain" 1006. A category of starved for migration of applications associated with a non-adopted functional domain indicates that minimal expenses are allocated for the development and maintenance of the functional domain because even though the non-adopted functional domain is retained during the current budget cycle, the non-adopted functional domain is likely to be eliminated in the near future. In a subsequent budget cycle, the expenses required may become available for migrating the applications associated with the non-adopted functional domain, which would change the "category" 1016 in such a situation to "approved." Categorizing a non-adopted functional domain as "starved" may achieve some value for an enterprise through significantly reduced up-front costs, due to saving from prior maintenance and development costs, which may be considered towards the total value provided by the selection and replacement process.

In yet another example, the "combined value" 1012 is $250,000 in benefits from migrating the applications associated with the non-adopted "first network engineering functional domain" 504, and the "combined cost to migrate" 1014 these applications is $1,000,000. Even if the enterprise has an additional $1,000,000 available for migrating applications, the enterprise may decide to not spend $1,000,000 to realize only $250,000 of benefits for migrating the applications associated with the "first network engineering functional domain" 504. The enterprise may decide to retain the applications associated with the "first network engineering functional domain" 504 for the current budget cycle, and defer any decision to migrate its applications until the future. Therefore, the "category" 1016 is listed as "deferred" for the migration of the applications associated with the "first network engineering functional domain" 504. In contrast to the "starved" category, significant expenses may be allocated for the development and maintenance of the applications associated with the non-adopted "first network engineering functional domain" 504 because a different functional domain may be adopted for network engineering during future budget cycles, and significant development and maintenance may be required until such a decision is made.

In one more example, the "combined value" 1012 is negative $125,000 in benefits from migrating the applications associated with the non-adopted "first network planning functional domain" 506, and the "combined cost to migrate" 1014 these applications is $140,000. Even if the enterprise has an additional $140,000 available for migrating applications, the enterprise may decide to not spend $140,000 to lose $125,000 from migrating the applications associated with the "first network planning functional domain" 506. The enterprise may decide to retain the applications associated with the "first network planning functional domain" 506 for the current budget cycle, and defer any decision to migrate its applications until the future. Therefore, the "category" 1016 is listed as "deferred" for the migration of the applications associated with the "first network planning functional domain" 506. In contrast to the "starved" category, significant expenses may be allocated for the development and maintenance of the applications associated with the non-adopted "first network planning functional domain" 506 because a different functional domain may be adopted for network planning during future budget cycles, and significant development and maintenance may be required until such a decision is made.

In box 326, the database manager stores the category for each non-adopted functional domain. For example, FIG. 10 depicts the illustrative display 1000 for each "category" 1016 for migration of each non-adopted functional domain that the database manager stores in a memory or a storage device.

Figure 11:
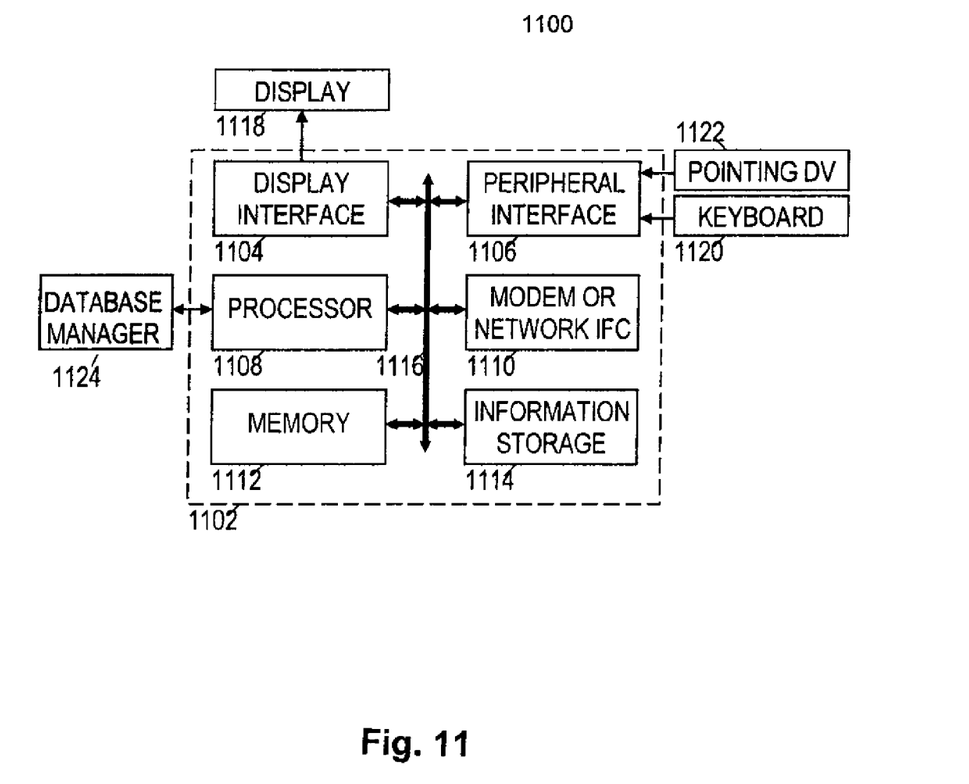
FIG. 11 shows a block diagram of an illustrative server for a functional domain based application selection and replacement system according to some embodiments of the present disclosure.

Turning now to FIG. 11, a block diagram 1100 of an illustrative server 1102 for a functional domain based application selection and replacement system is depicted according to some embodiments of the present disclosure. The server 1102 may comprise a "display interface" 1104, a "peripheral interface" 1106, a "processor" 1108, a "modem" or other suitable "network" interface 1110, a "memory" 1112, an "information storage" device 1114, and a bus 1116. The server 1102 may be a bus-based computer, with the bus 1116 interconnecting the other elements and carrying communications between them. The "display interface" 1104 may take the form of a video card or other suitable display interface that accepts information from the bus 1116 and transforms it into a form suitable for a "display" 1118. Conversely, the "peripheral interface" 1106 may accept signals from a "keyboard" 1120, and other input devices such as a "pointing" device 1122, and transform them into a form suitable for communication on the bus 1116. Such forms suitable for communication may include survey responses for compiling data for each ecosystem.

The "processor" 1108 gathers information from other system elements, including input data from the "peripheral interface" 1106, and program instructions and other data from the "memory" 1112, the "information storage" device 1114, or from a remote location via the "network" interface 1110. The "processor" 1108 carries out the program instructions and processes the data accordingly. The "processor" 1108 executes instructions for a "database manager" 1124 application. The program instructions may further configure the "processor" 1108 to execute instructions for the "database manager" 1124 application to send data to other system elements, comprising information for the user which may be communicated via the "display interface" 1104 and the "display" 1118, information such as the table for migrating functional domains depicted in FIG. 10.

The "network" interface 1110 enables the "processor" 1108 to communicate with remote systems via a network. The "memory" 1112 may serve as a low-latency temporary store of information for the "processor" 1108, and the "information storage" device 1114 may serve as a long term (but higher latency) store of information, including information such as the "category" 1016 for migrating functional domains depicted in FIG. 10.

The "processor" 1108, and hence the server 1102 as a whole, operates in accordance with one or more programs stored on the "information storage" device 1114, such as the "database manager" 1124 application. The "processor" 1108 may copy portions of the programs into the "memory" 1112 for faster access, and may switch between programs or carry out additional programs in response to user actuation of the input device. The additional programs, such as the "database manager" 1124 application, may be retrieved from the "information storage" device 1114 or may be retrieved from remote locations via the "network" interface 1110. One or more of these programs, including the "database manager" 1124 application, configures the server 1102 to carry out at least one of the functional domain based application selection and replacement methods disclosed herein.

The server 1102 is described as a general server, although any electronic device having some amount of computing power coupled to a user interface may be configured to carry out the methods disclosed herein. Among other things, personal computers, portable computers, personal digital assistants (PDAs) and mobile phones may be configured to carry out aspects of the disclosed functional domain based application selection and replacement methods.

The "display" 1118 may be a video monitor, but may take many alternative forms such as a printer, a speaker, or other means for communicating information to a user, information such as the table for migrating functional domains depicted in FIG. 10. The input device for the user interface is shown as the "keyboard" 1120, but may similarly take many alternative forms such as a button, a mouse, a keypad, a dial, a motion sensor, a camera, a microphone or other means for receiving information from a user, information such as survey responses for compiling data for each ecosystem.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. A method for ecosystem based application selection, comprising:

grouping, by a database manager stored on a non-transitory computer readable medium and executable by a processor, applications for a first entity into a first set of functional domains based on business categories of the applications for the first entity and functions of the applications for the first entity, wherein at least some of the functional domains of the first set of functional domains comprise one or more related applications of the first entity;

grouping, by the database manager, applications for a second entity into a second set of functional domains based on business categories of the applications for the second entity and functions of the applications for the second entity and by using the first set of functional domains as a template, wherein at least some of the functional domains of the second set of functional domains comprise one or more related applications of the second entity, wherein each functional domain in the first set of functional domains has a corresponding functional domain in the second set of functional domains, and wherein each functional domain in the second set of functional domains has a corresponding functional domain in the first set of functional domains;
grouping, by the database manager, the first set of functional domains into a first set of ecosystems based on a number of application interfaces between the applications in each functional domain of the first set of functional domains, wherein each ecosystem of the first set of ecosystems comprises a plurality of functional domains of the first set of functional domains;
grouping, by the database manager, the second set of functional domains into a second set of ecosystems that parallel the first set of ecosystems;
comparing a plurality of ecosystem factors in a pair-wise manner for each ecosystem type of the first set of ecosystems and the second set of ecosystems;
evaluating each application in each ecosystem of the first set of ecosystems and the second set of ecosystems based on the same plurality of ecosystem factors;
compiling, by a user interface stored on a non-transitory computer readable medium and executable by a processor, data associated with the comparing and the evaluating for each ecosystem of the first set of ecosystems and the second set of ecosystems;
combining the first entity with the second entity; and
selecting for adoption, by the user interface, when combining the first entity with the second entity, an ecosystem of the first set of ecosystems from the first entity or a corresponding ecosystem of the second set of ecosystems from the second entity, for each ecosystem, based on the compiled data.

2. The method of claim 1 further comprising un-adopting adopted applications based on exception rules and the compiled data.

3. The method of claim 1 further comprising adopting un-adopted applications based on exception rules and the compiled data.

4. The method of claim 1 wherein each ecosystem comprises a minimum number of associated applications.

5. The method of claim 1 wherein the plurality of ecosystem factors comprises business value, functional value, technology fit, cost, complexity, and quality.

6. The method of claim 1 wherein the first set of functional domains and the second set of functional domains are based on enhanced telecom operations map standards.

7. The method of claim 1, comprising:
non-adopting the other of the one of an ecosystem of the first set of ecosystems from the first entity and a corresponding ecosystem of the second set of ecosystems from the second entity, for each ecosystem;
evaluating, by the database manager, an information technology value for migration of each non-adopted functional domain associated with each of the non-adopted ecosystems;
evaluating, by the database manager, a business value for migration of each non-adopted functional domain associated with each of the non-adopted ecosystems;
combining, by the database manager, the information technology value and the business value for each non-adopted functional domain;
prioritizing, by the database manager, each non-adopted functional domain for migration based on the combined information technology value and business value for each non-adopted functional domain;
categorizing, by the database manager, each non-adopted functional domain for migration based on the priority for each non-adopted functional domain; and
storing, by the database manager, a category for each non-adopted functional domain.

8. The method of claim 7 wherein evaluating information technology value comprises evaluating at least one of licensing costs, maintenance costs, development costs, and costs to achieve.

9. The method of claim 7 wherein evaluating business value comprises evaluating at least one of synergies, cost savings, revenue generation, training costs, and costs to achieve.

10. The method of claim 7 wherein categorizing each non-adopted functional domain for migration comprises categorizing each non-adopted functional domain as approved, starved, or deferred.

11. The method of claim 1 wherein a functional domain of the first set of functional domains comprises one or more related applications of the first entity and the corresponding functional domain of the second set of functional domains comprises no applications of the second entity.

12. The method of claim 1 wherein a functional domain of the first set of functional domains comprises no applications of the first entity and the corresponding functional domain of the second set of the functional domains comprises one or more applications of the second entity.

13. The system of claim 1 further comprising migrating non-adopted functional domains.

14. The method of claim 7 wherein the evaluating an information technology value for migration of each non-adopted functional domain comprises evaluating an information technology value for each non-adopted application associated with each non-adopted functional domain, and wherein the evaluating a business technology value for migration of each non-adopted functional domain comprises evaluating a business technology value for each non-adopted application associated with each non-adopted functional domain.

15. A system for ecosystem based applications selection, comprising:
a database manager stored on a non-transitory computer readable medium and executable by a processor to group applications for a first entity into a first set of functional domains based on business categories of the applications for the first entity and functions of the applications for the first entity, wherein at least some of the functional domains of the first set of functional domains comprise one or more related applications of the first entity;
the database manager further executable to group applications for a second entity into a second set of functional domains based on business categories of the applications for the second entity and functions of the applications for the second entity and by using the first set of functional domains as a template, wherein at least some of the functional domains of the second set of functional domains comprise one or more related applications of the second entity, wherein each functional domain in the first set of functional domains has a corresponding functional domain in the second set of functional domains, and wherein each functional domain in the second set of functional domains has a corresponding functional domain in the first set of functional domains;

the database manager further executable to group the first set of functional domains into a first set of ecosystems based on a number of application interfaces between the applications in each functional domain of the first set of functional domains, wherein each ecosystem of the first set of ecosystems comprises a plurality of functional domains of the first set of functional domains;

the database manager further executable to group the second set of functional domains into a second set of ecosystems that parallel the first set of the ecosystems;

a user interface coupled to the database manager and stored on a non-transitory computer readable medium and executable by a processor to receive data comprising a pair-wise comparison of a plurality of ecosystem factors for each ecosystem type of the first set of ecosystems and the second set of ecosystems and an evaluation of each application in each ecosystem of the first set of ecosystems and the second set of ecosystems based on the same plurality of ecosystem factors;

the user interface further executable to compile the data for each ecosystem of the first set of ecosystems and the second set ecosystems; and the user interface further executable when combining the first entity with the second entity to select for adoption an ecosystem of the first set of ecosystems from the first entity or a corresponding ecosystem of the second set of ecosystems from the second entity, for each ecosystem, based on the compiled data, wherein the first entity is combined with the second entity.

16. The system of claim 15 wherein the user interface is further operable to un-adopt adopted applications based on exception rules and the compiled data.

17. The system of claim 15 wherein the user interface is further operable to adopt un-adopted applications based on exception rules and the compiled data.

18. The system of claim 15 wherein each ecosystem comprises a minimum number of associated applications.

19. The system of claim 15 wherein the plurality of ecosystem factors comprises business value, functional value, technology fit, cost, complexity, and quality.

20. The system of claim 15 wherein the first set of functional domains and the second set of functional domains are based on enhanced telecom operations map standards.

* * * * *